United States Patent
Kim et al.

(10) Patent No.: US 10,340,830 B2
(45) Date of Patent: Jul. 2, 2019

(54) APPARATUS AND METHOD FOR VARIABLY CONTROLLING ALTERNATOR

(71) Applicant: Hyundai Motor Company, Seoul (KR)

(72) Inventors: Doo-Hyun Kim, Daegu (KR); Hyun Kim, Gyeonggi-do (KR); Bon-Chang Koo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 83 days.

(21) Appl. No.: 15/232,132

(22) Filed: Aug. 9, 2016

(65) Prior Publication Data

US 2017/0117837 A1   Apr. 27, 2017

(30) Foreign Application Priority Data

Oct. 27, 2015   (KR) .................. 10-2015-0149677

(51) Int. Cl.
| | |
|---|---|
| *H02P 9/00* | (2006.01) |
| *H02P 9/48* | (2006.01) |
| *B60W 10/30* | (2006.01) |
| *H02J 7/24* | (2006.01) |
| *H04L 29/08* | (2006.01) |

(52) U.S. Cl.
CPC .............. *H02P 9/48* (2013.01); *B60W 10/30* (2013.01); *H02J 7/242* (2013.01); *H04L 67/10* (2013.01)

(58) Field of Classification Search
CPC .................................. H02P 9/48; H02J 7/242
USPC ..... 290/40 R, 40 C, 40 B; 322/44; 307/10.1; 180/65.23, 65.28
See application file for complete search history.

(56) References Cited

U.S. PATENT DOCUMENTS

| | | | |
|---|---|---|---|
| 5,986,439 A | | 11/1999 | Pletta et al. |
| 6,018,198 A | * | 1/2000 | Tsuzuki ................. B60K 6/365 180/65.25 |
| 6,629,027 B2 | * | 9/2003 | Yamaguchi .............. B60K 6/48 180/65.25 |
| 7,170,262 B2 | | 1/2007 | Pettigrew |
| 2001/0020789 A1 | * | 9/2001 | Nakashima ........... B60K 6/365 290/40 C |
| 2002/0062183 A1 | * | 5/2002 | Yamaguchi .............. B60K 6/46 701/22 |
| 2003/0074115 A1 | * | 4/2003 | Yamaguchi .............. B60K 6/48 701/22 |
| 2008/0191482 A1 | * | 8/2008 | Okuno ...................... H02P 9/48 290/7 |
| 2009/0039838 A1 | * | 2/2009 | Maehara ................. H02J 7/245 322/19 |

(Continued)

FOREIGN PATENT DOCUMENTS

| | | |
|---|---|---|
| JP | 2006-054936 A | 2/2006 |
| JP | 2008-511273 A | 4/2008 |

(Continued)

*Primary Examiner* — Julio C. Gonzalez
(74) *Attorney, Agent, or Firm* — Mintz Levin Cohn Ferris Glovsky and Popeo, P.C.; Peter F. Corless

(57) ABSTRACT

An apparatus for variably controlling an alternator is provided. The apparatus includes a controller that determines a state of an engine of a vehicle and calculates a target generation rate. An alternator generates electricity based on the target generation rate and produces generation power. The alternator also variably adjusts responsiveness to the generation based on the determination of the state of the engine and a battery is configured to be charged by the generation power.

14 Claims, 4 Drawing Sheets

(56) References Cited

U.S. PATENT DOCUMENTS

| | | | | |
|---|---|---|---|---|
| 2009/0195223 A1* | 8/2009 | Maehara | ............... | H04L 12/403 |
| | | | | 322/24 |
| 2012/0089287 A1* | 4/2012 | Nishiyama | .............. | B66C 13/12 |
| | | | | 701/22 |
| 2013/0335041 A1* | 12/2013 | Baek | ....................... | H02M 7/12 |
| | | | | 322/89 |

FOREIGN PATENT DOCUMENTS

| KR | 10-0778596 | 11/2007 |
|---|---|---|
| KR | 10-2008-0042236 A | 5/2008 |
| KR | 10-2010-0041131 | 4/2010 |
| KR | 10-2015-0009555 | 1/2015 |

\* cited by examiner

APPARATUS AND METHOD FOR VARIABLY CONTROLLING ALTERNATOR

CROSS-REFERENCE(S) TO RELATED APPLICATIONS

This application claims priority to Korean Patent Application No. 10-2015-0149677 filed on Sep. 27, 2008, which is incorporated herein by reference in its entirety.

BACKGROUND

Field of the Invention

The present invention relates to a technique for controlling an alternator; and, more particularly, to apparatus and method for variably controlling an alternator which mitigates idle booming and optimizes voltage control by variably adjusting responsiveness of the alternator based on conditions of an engine.

Description of Related Art

Generally, batteries are used as power supplies for vehicles. When a battery is used without being charged, it gradually deteriorates in performance. Therefore, there is the need for a battery to be charged rapidly during each use. A charging apparatus, in lieu of a battery, may be configured to supply current to other electronic device loads (an ignition device, headlamps, a radio, an air conditioner, etc.). An alternator is one of components of the charging apparatus. Typically, generator type alternators, which produce direct current using a commutator, have been used. However, recently, as the semiconductor technology continues to evolve, alternators which produce alternating current (AC) and convert the current into direct current using a diode have been used.

Generally, after a vehicle starts, the alternator is operated to supply electric energy required for the vehicle. A regulator maintains generation voltage of the alternator constant. In particular, generation is conducted based on a target generation value of an engine control unit (ECU). A generation rate signal of the alternator is transmitted to the ECU. Particularly, according to the settings of proportional integral control values in the regulator, the responsiveness is set to a fixed value.

Therefore, when the responsiveness is adjusted to be high, a problem of revolution per minute (RPM) oscillation may occur when idling. In other words, the range of fluctuation in generation rate with respect to external loads is excessively increased. Unlike this, when the responsiveness is adjusted to be low, a problem of voltage overshoot may be caused after full-load conditions are released. In other words, overvoltage conditions are caused, whereby controlling some components (e.g., CVVT control, purge control, etc.) may be interrupted, and failure diagnosis may become impossible.

SUMMARY

An exemplary embodiment of the present invention is directed to apparatus and method for variably controlling an alternator to prevent problems that result from deterioration in performance of a vehicle and inability in failure diagnosis caused by overvoltage. Another exemplary embodiment of the present invention is directed to apparatus and method for variably controlling an alternator which may prevent occurrence of a field claim due to idle booming.

Other objects and advantages of the present invention may be understood by the following description, and become apparent with reference to the embodiments of the present invention. Also, it is obvious to those skilled in the art to which the present invention pertains that the objects and advantages of the present invention may be realized by the means as claimed and combinations thereof.

In order to accomplish the above purposes, the present invention provides an apparatus for variably controlling an alternator which may prevent problems resulting from deterioration in performance of a vehicle and inability in failure diagnosis caused by overvoltage.

In accordance with an exemplary embodiment of the present invention, an apparatus for variably controlling an alternator may include: a controller configured to determine a state of an engine of a vehicle and calculate a target generation rate; an alternator configured to generate electricity based on the target generation rate and produce generation power, the alternator variably configured to adjust responsiveness to the generation based on a result of determining the state of the engine; and a battery configured to be charged by the generation power.

The variable adjustment may include dividing the state of the engine of the vehicle into an idle region and a driving region and variable adjusting the responsiveness of the alternator. Control of the generation power may include a slowest mode, a slower mode, a slow mode, and a normal mode. When the variable adjustment is associated with the driving region, the control of the generation power may be in the slowest mode. When the variable adjustment is associated with the idle region, the control of the generation power may be in the normal mode. Communication between the alternator and the controller may be conducted by a local interconnect network (UN) communication method.

Further, the setting of the variable adjustment may be conducted based on a value of a parameter (PARA) bit on an alternator control message frame of the LIN communication method. The value of the PARA bit may be "0" in a normal operation mode and be "1" in an operation mode without battery. The control of the generation power may include a proportional integral (PI) control of integrating a difference between the generation power and a preset reference voltage and reducing residual deviation. The alternator may include: a generation motor configured to produce the generation power; a regulator configured to operate the generation motor; and a rectifier circuit configured to rectify the generation power and supply the rectified generation power to the battery.

In accordance with another exemplary embodiment of the present invention, a method for variably controlling an alternator may include: calculating, by a controller, a target generation rate; generating, by the alternator, electricity based on the target generation rate and producing generation power; determining, by the controller, a state of an engine of a vehicle; variably adjusting, by the alternator, responsiveness to the generation based on a result of determining the state of the engine; and charging, by the alternator, a battery with the generation power.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DETAILED DESCRIPTION

Figure 1:
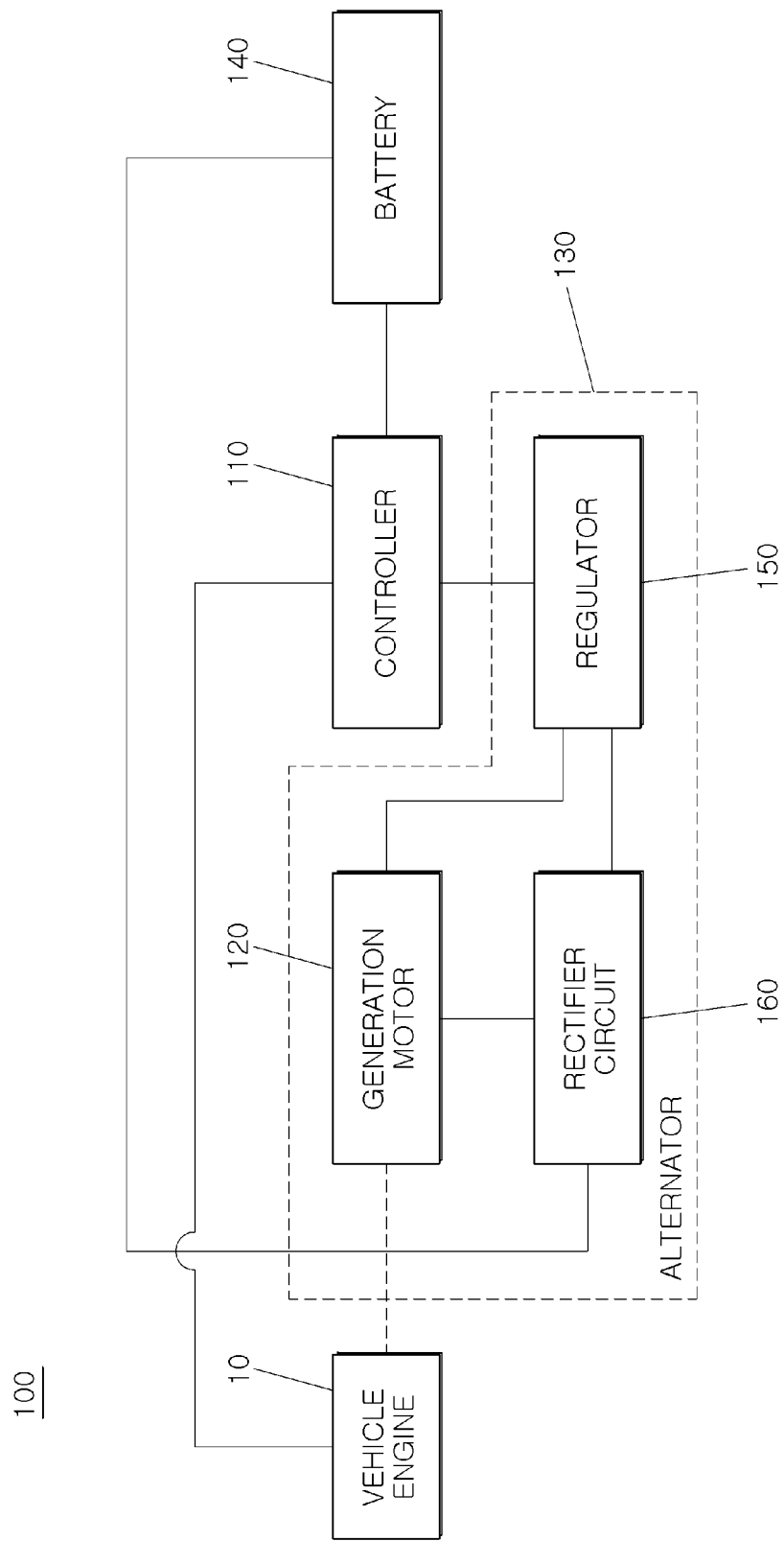
FIG. 1 is a block diagram illustrating an apparatus for variably controlling an alternator according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will not be made in detail to various exemplary embodiments of the present invention, specific examples of which are illustrated in the accompanying drawings and described below, since the exemplary embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

Throughout the disclosure, like reference numerals refer to like parts throughout the various figures and embodiments of the present invention. It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, apparatus and method for variably controlling an alternator according to an embodiment of the present invention will be described with reference to the attached drawings.

FIG. 1 is a block diagram illustrating an apparatus 100 for variably controlling an alternator according to an exemplary embodiment of the present invention. Referring to FIG. 1, the alternator variable-control apparatus 100 may include a controller 110 configured to determine the state of a vehicle engine 10 and calculate a target generation rate, an alternator 130 configured to generate electricity based on the target generation rate and produce generation power and variably adjust responsiveness to the generation based on the determination of the state of the vehicle engine 10, and a battery 140 charged with the generation power.

The alternator 130 may include a generation motor 120 configured to produce the generation power, a regulator 150 configured to operate the generation motor, and a rectifier circuit 160 configured to rectify the generation power and supply the generation power to the battery. The vehicle engine 10 may be coupled to a generation motor 120 by a connection device such as an engine belt or the like. As the vehicle engine 10 rotates, the generation motor 120 may be configured to rotate and thus generate electricity.

Furthermore, the vehicle engine 10 may be a continuous variable valve timing (CVVT) engine, a double over head camshaft (DOHC) engine, a continuous valve timing (CVT) engine, a gasoline direct injection (GDI) engine, or a multi-point injection (MPI) engine, which uses gasoline as fuel, a common rail direct injection (CRDI) engine, a high direction turbo intercooler (HU) engine, or a variable geometry turbocharger (VGT) engine, which uses diesel as fuel, or a liquid propane injection (LPI) engine, which uses gas as fuel.

The output (e.g., revolution per minute; RPM) of the vehicle engine 10 may be adjusted by adjusting a fuel rate in response to a fuel control signal of the controller 110. Information regarding the adjusted output (RPM) of the vehicle engine 10 may be transmitted to the controller 110 in a form of an RPM sensing signal. Furthermore, the controller 110 may be configured to detect the state of the vehicle engine 10 and calculate a target generation rate for the alternator 130. In particular, the controller 110 may be coupled with the regulator 150 of the alternator 130 via a communication means.

The communication between the regulator 150 and the controller 110 may be embodied by a local interconnect network (UN) communication method. However, the present invention is not limited to this. For instance, controller area network (CAN), power line communication (PLC), control pilot (CP), ZigBee, Bluetooth, etc. may be used. The regulator 150 of the alternator 130 may be operated by a motor drive signal of the controller 110. In particular, the controller 110 may be configured to calculate a target generation value based on the state of the vehicle engine 10 and transmit a control signal that corresponds to the target generation value to the regulator 150. Furthermore, the controller 110 may be configured to monitor an RPM sensing signal transmitted from the vehicle engine and operate the vehicle engine 10 and/or the alternator 130 to adjust the RPM of the vehicle engine 10 to teach a target output (RPM) value.

The regulator 150 may be configured to maintain a generation rate (e.g., generation voltage) by adjusting current by adjusting a rotor-side field of the generation motor 120 regardless of the rotating speed thereof. The regulator 150 may be connected to a stator and/or a rotor of the generation motor 120 by a connection device. The rectifier circuit 160 may be configured to convert generation power produced from the generation motor 120 into charging power. In particular, since the generation power may generally be alternating current (AC) power, the rectifier circuit 160 may be configured to rectify AC power and thus convert the AC power into direct-current (DC) power. Particularly, the rectifier circuit 160 may include metal-oxide-semiconductor field-effect transistors (MOSFETs), rectification diodes, etc. The rectification operation may be performed by a drive signal of the regulator 150.

The battery 140 may include a plurality of battery cells (not shown) which are configured in series and/or parallel. The battery cells may form a low-voltage charge battery for electric vehicles such as a nickel-metal battery, a lithium-ion battery, a lithium-polymer battery, an all-solid battery, etc. Particularly, in an exemplary embodiment of the present invention, the battery 140 may be a 12V battery configured to supply power to electronic device loads (headlamps, wipers, etc.). However, the present invention is not limited to this. A high-voltage battery may be used. The term "high-voltage" refers to voltage of about 100V or greater.

Figure 2:
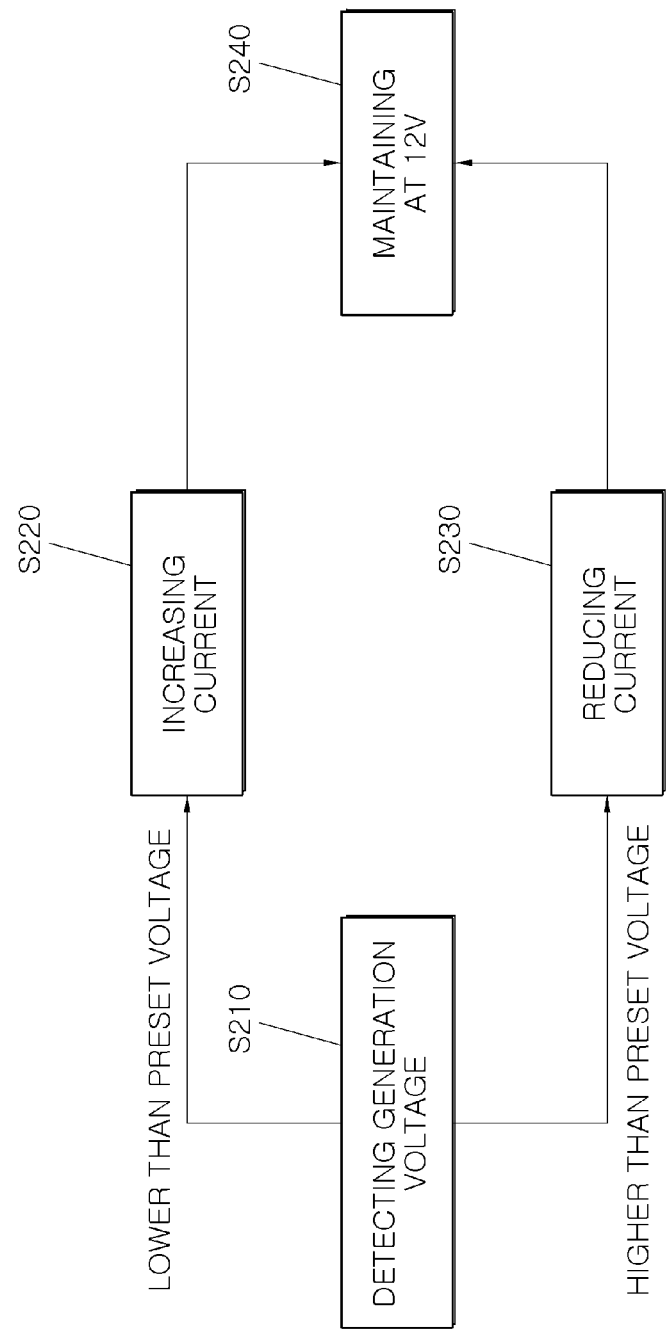
FIG. 2 is a conceptual diagram showing general voltage control flow of a regulator shown in FIG. 1 according to an exemplary embodiment of the present invention.

FIG. 2 is a conceptual diagram showing general voltage control flow of the regulator (150 of FIG. 1). Referring to FIG. 2, the regulator 150 may be configured to generate generation power (e.g., generation voltage) produced from the generation motor (120 of FIG. 1), at step S210. When the detected generation power is less than a preset voltage, the regulator 150 may be configured to increase current by adjusting the rotor-side field of the generation motor 120, at step S220.

Further, when the detected generation power is greater than the preset voltage, the regulator 150 may be configured to reduce current, at step S230. Accordingly, the generation power may be maintained through the step S2100 to S230, at step S240. In particular, the generation power control operation in which the regulator 150 controls a power generation rate includes the following four modes.

① slowest mode
② slower mode
③ slow mode
④ normal mode

Generally, while idling in a drive (D) position of the vehicle, the regulator 150 may be configured to set a proportional integral (PI) control parameter F-PARA to a "slowest mode" to reduce RPM oscillation. Although this has the effect of preventing booming of the vehicle while idling in D position, there is the possibility of side effects since overvoltage of the battery may be caused when the vehicle uses electricity at full load.

When the regulator 150 adjusts the power generation rate, PI control of integrating a difference between the generation voltage and the preset reference voltage and reducing a residual deviation may be used. The PI control is a control method of accumulating minimal residual deviation with respect to time to form comparatively substantial deviation and then reducing an error. Therefore, when the PI control parameter is used in the slowest mode to prevent the booming phenomenon of the vehicle, the time required to accumulate the residual deviation increases, whereby charging/discharging responsiveness of the alternator decreases. Then, voltage overshoot may be caused before the controller 110 adjusts the voltage thus causing a risk of overvoltage.

Consequently, in the exemplary embodiment of the present invention, the PI control parameter used as the fixed value may be variably adjusted based on the state of the engine of the vehicle and thus, the regulator 150 may be configured to adjust the generation power to the optimal state. In particular, the PI control may be divided into an idle region and a driving region (other than the idle region) and may be applied as follows.

① idle region: When the vehicle is idling, the PI control is set to the slowest mode to adjust RPM oscillation.
② driving region (other than the idle region): The PI control is set to the normal mode to prevent momentary battery overvoltage.

Figure 3:
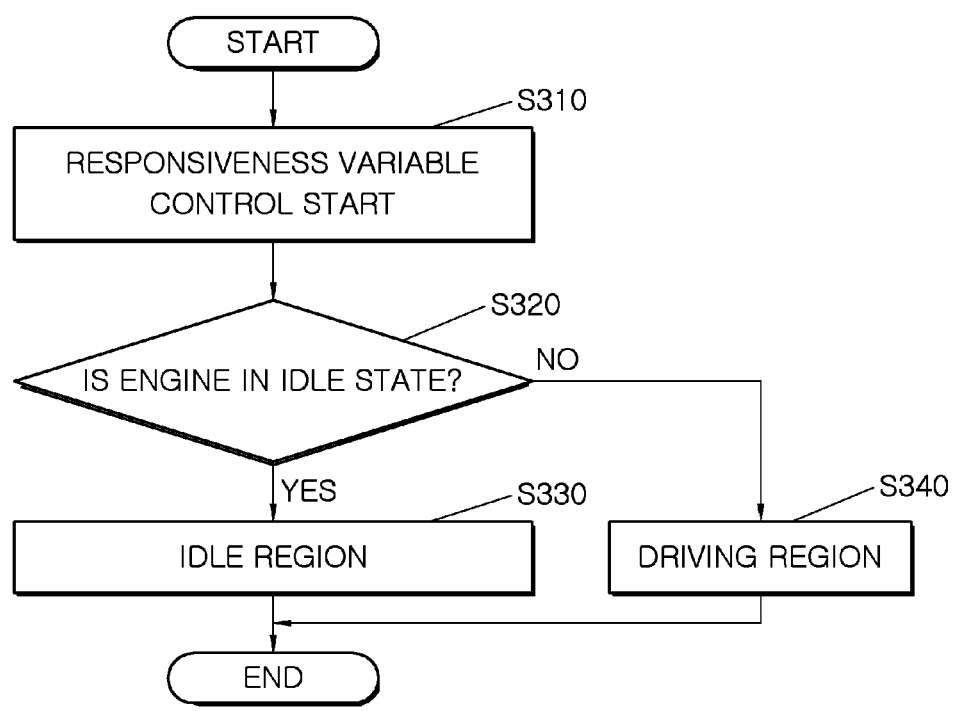
FIG. 3 is a flowchart showing a process of controlling the regulator depending on the state of a vehicle according to the exemplary embodiment of the present invention.

FIG. 3 is a flowchart showing a process of controlling the regulator based on the state of a vehicle according to the exemplary embodiment of the present invention. Referring to FIG. 3, the controller (110 of FIG. 1) may be configured to detect the state of the engine (10 of FIG. 1) and calculate the target generation rate. The alternator may be configured to generate electricity based on the target generation rate to produce generation power and begin to variably adjust the responsiveness, at step s310.

As the variable responsiveness control begins, the controller (110 of FIG. 1) may be configured to determine whether the state of the engine is the idle state, at step S320. When, as the result of the determination, the state of the engine is the idle state, the controller 110 may be configured to determine that the state of the engine is associated with the idle region and adjust the regulator (150 of FIG. 1) to the slowest mode, at step S330. In particular, the controller 110 may be configured to set a parameter (PARA) bit on an alternator control message frame ALT_CONTROL Message Frame to "1" and transmit the parameter bit to the regulator 150. In response to receiving the alternator control message, the regulator 150 may be operated in the slowest mode.

Furthermore, when, as the result of the determination of step S320, the state of the engine is not the idle state, the controller 110 may be configured to determine that the engine state is associated with the driving region and adjust the regulator (150 of FIG. 1) to the normal mode, at step S340. In particular, the controller 110 may be configured to set a parameter (PARA) bit on an alternator control message frame ALT_CONTROL Message Frame to "0" and transmit the parameter bit to the regulator 150. Therefore, in response to receiving this alternator control message, the regulator 150 may be operated in the normal mode. For the sake of understanding, these are shown as the following table.

TABLE 1

| Engine state | Alternator (F-PARA) | Controller (PARA-bit) | Regulator control operation |
|---|---|---|---|
| Driving region | NORMAL | 0 | Operation in NORMAL mode |
| Idle region | SLOWEST | 1 | Operation in Slowest mode | wherein, the PARA bit is characterized in that it is "0" in a normal operation mode and "1" in an operation mode without battery.

Figure 4:
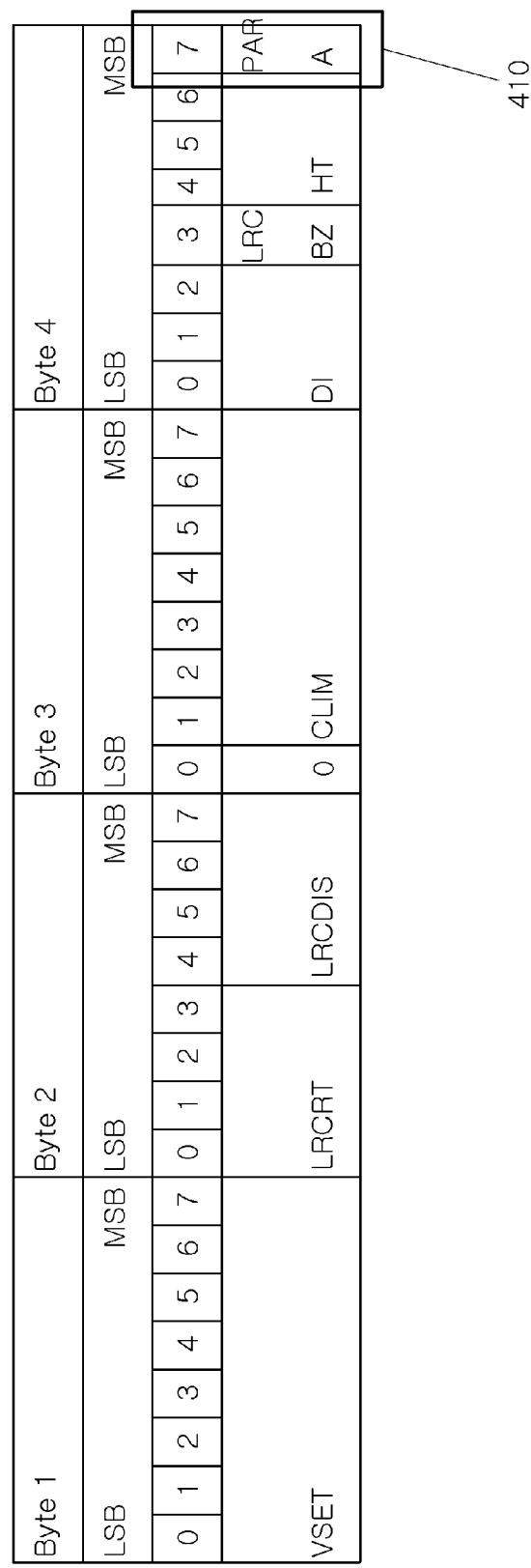
FIG. 4 illustrates the configuration of a control message frame for controlling the regulator according to the exemplary embodiment of the present invention.

FIG. 4 illustrates the configuration of the control message frame for controlling the regulator according to the exemplary embodiment of the present invention. Referring to FIG. 4, the control message frame may include a plurality of bytes, and each byte may include a most significant bit (MSB) and a least significant bit (LSB). Furthermore, the MSB of Byte 4 includes a PARA bit 410.

According to the present invention, a regulator variably controls (e.g., adjusts) generation voltage based on the state of a vehicle, thus solving problems of idle booming and/or overvoltage. Furthermore, the present invention has another effect in that field claim can be prevented from occurring due to idle booming.

While the present invention has been described with respect to the exemplary embodiments, it will be apparent to those skilled in the art that various changes and modifications may be made without departing from the spirit and scope of the invention as defined in the following claims.

What is claimed is:

1. An apparatus for variably controlling an alternator, comprising:
a controller configured to determine a state of an engine of a vehicle and calculate a target generation rate;
an alternator configured to generate electricity based on the target generation rate and produce generation power, the alternator variably adjusting responsiveness to the generation based on the determination of the state of the engine; and
a battery configured to be charged by the generation power,
wherein the variable adjustment includes dividing the state of the engine of the vehicle into an idle region and a driving region and variably adjusting the responsiveness of the alternator according to whether the state of the engine is the idle region or the driving region, and
wherein the responsiveness of the alternator is set to a slowest mode in the idle region so as to control revolution per minute (RPM) oscillation, and the responsiveness of the alternator is set to a normal mode in the driving region so as to prevent momentary battery overvoltage.

2. The apparatus of claim 1, wherein control of the generation power includes the slowest mode, a slower mode, a slow mode, and the normal mode.

3. The apparatus of claim 1, wherein communication between the alternator and the controller is conducted by a local interconnect network (LIN) communication method.

4. The apparatus of claim 3, wherein setting the variably adjustment is conducted based on a value of a parameter (PARA) bit on an alternator control message frame of the LIN communication method.

5. The apparatus of claim 4, wherein the value of the PARA bit is "0" in a normal operation mode and is "1" in an operation mode without battery.

6. The apparatus of claim 1, wherein control of the generation power include a proportional integral (PI) control of integrating a difference between the generation power and a preset reference voltage and reducing residual deviation.

7. The apparatus according to claim 1, wherein the alternator includes:
a generator configured to produce the generation power;
a regulator configured to operate the generator; and
a rectifier circuit configured to rectify the generation power and supply the rectified generation power to the battery.

8. A method for variably controlling an alternator, comprising:
calculating, by a controller, a target generation rate;
generating, by the alternator, electricity based on the target generation rate and producing generation power;
determining, by the controller, a state of an engine of a vehicle;
variably adjusting, by the alternator, responsiveness to the generation based on the determination of the state of the engine; and
charging, by the alternator, a battery with the generation power,
wherein the variable adjustment includes dividing the state of the engine of the vehicle into an idle region and a driving region and variably adjusting the responsiveness of the alternator according to whether the state of the engine is the idle region or the driving region, and
wherein the responsiveness of the alternator is set to a slowest mode in the idle region so as to control revolution per minute (RPM) oscillation, and the responsiveness of the alternator is set to a normal mode in the driving region so as to prevent momentary battery overvoltage.

9. The method of claim 8, wherein control of the generation power includes the slowest mode, a slower mode, a slow mode, and the normal mode.

10. The method of claim 8, wherein communication between the alternator and the controller is conducted by a local interconnect network (LIN) communication method.

11. The method of claim 10, wherein setting the variably adjusting is conducted based on a value of a parameter (PARA) bit on an alternator control message frame of the LIN communication method.

12. The method of claim 11, wherein the value of the PARA bit is "0" in a normal operation mode and is "1" in an operation mode without battery.

13. The method of claim 8, wherein control of the generation power includes a proportional integral (PI) control of integrating a difference between the generation power and a preset reference voltage and reducing a residual deviation.

14. The method according to claim 8, wherein the alternator includes:
a generator configured to produce the generation power;
a regulator configured to operate the generator; and
a rectifier circuit configured to rectify the generation power and supply the rectified generation power to the battery.

* * * * *